(12) United States Patent
Lynch et al.

(10) Patent No.: US 9,311,285 B2
(45) Date of Patent: Apr. 12, 2016

(54) CURATING CHAT TRANSCRIPTS INTO WEBPAGES (71) Applicant: NEEDLE, INC., Bluffdale, UT (US)

(72) Inventors: Morgan Ivan Lynch, Alpine, UT (US); Brian Cody Bond, Salt Lake City, UT (US)

(73) Assignee: NEEDLE, INC., Bluffdale, UT (US)

( * ) Notice: Subject to any disclaimer, the term of this patent is extended or adjusted under 35 U.S.C. 154(b) by 0 days.

(21) Appl. No.: 14/341,706

(22) Filed: Jul. 25, 2014

(65) Prior Publication Data
US 2015/0033114 A1 Jan. 29, 2015

Related U.S. Application Data (60) Provisional application No. 61/859,149, filed on Jul. 26, 2013.

(51) Int. Cl.
G06F 3/00 (2006.01)
G06F 17/22 (2006.01)
G06Q 30/02 (2012.01)

(52) U.S. Cl.
CPC ........ G06F 17/2264 (2013.01); G06Q 30/0276 (2013.01)

(58) Field of Classification Search
CPC ....... G06Q 30/02; G06Q 10/10; G06Q 10/06; G06Q 30/0601; G06Q 30/0623; G06Q 30/0613; G06Q 30/0617; G06Q 30/0201; G06Q 30/0276; G06F 17/2264

USPC .......... 715/229, 234, 243, 254, 255
See application file for complete search history.

(56) References Cited

U.S. PATENT DOCUMENTS

| | | | |
|---|---|---|---|
| 2004/0139032 A1* | 7/2004 | Rowan | 705/80 |
| 2004/0176971 A1 | 9/2004 | Machida et al. | |
| 2008/0270555 A1 | 10/2008 | Reynolds et al. | |
| 2010/0180217 A1* | 7/2010 | Li | H04L 12/1818 715/758 |
| 2012/0284290 A1 | 11/2012 | Keebler et al. | |
| 2012/0290708 A1* | 11/2012 | Siemsgluess | G06Q 30/02 709/224 |
| 2012/0324016 A1* | 12/2012 | Stolorz et al. | 709/204 |
| 2013/0275862 A1* | 10/2013 | Adra | 715/234 |
| 2014/0278367 A1* | 9/2014 | Markman et al. | 704/9 |

FOREIGN PATENT DOCUMENTS

WO 02/25627 3/2002

OTHER PUBLICATIONS

International Search Report and Written Opinion mailed Oct. 27, 2014, in related PCT Application No. PCT/US14/48493.

* cited by examiner

*Primary Examiner* — Kyle Stork
(74) *Attorney, Agent, or Firm* — Maschoff Brennan (57) ABSTRACT

Curating chat transcripts into webpages. In one example embodiment, a method of curating chat transcripts into webpages includes generating a transcript of a chat, selecting the chat transcript for curation, curating the chat transcript by adding preferable information to the chat transcript and/or deleting non-preferable information from the chat transcript, and publishing the curated chat transcript as a webpage.

31 Claims, 5 Drawing Sheets

CURATING CHAT TRANSCRIPTS INTO WEBPAGES

CROSS-REFERENCE TO A RELATED APPLICATION

This application claims the benefit of and priority to U.S. Provisional Application No. 61/859,149, filed Jul. 26, 2013, titled "CURATING CHAT TRANSCRIPTS INTO WEBPAGES IN ORDER TO DRIVE TRAFFIC TO A WEBSITE," which is incorporated herein by reference in its entirety.

FIELD

The embodiments disclosed herein relate to curating chat transcripts into webpages.

BACKGROUND

Website customer support and sales support have traditionally been accomplished by providing website visitors with a telephone number that a visitor can call to reach an agent of the website to discuss the needs of the visitor. While telephone communication remains a valid option for website customer support and sales support, some visitors prefer a somewhat less intrusive method of communication for accessing customer support or sales support, such as a chat system.

Traditional chat systems enable an agent of a website, such as a sales agent or a support agent, and a visitor of the website to send short text messages back and forth using a chat window. For example, a visitor can use a traditional chat window to solicit additional information about a product that is offered for sale on the website before purchasing the product. A visitor can also use a traditional chat window to solicit help with a problem with a product that the visitor previously purchased from the website.

Unfortunately, the information exchanged using existing chat systems is generally transitory because chats between agents and visitors are not stored or otherwise available to be utilized after the conclusion of the chats. This transitory nature of existing chat systems can result in the loss of valuable information that is conveyed during a chat.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to curating chat transcripts into webpages. In particular, the example methods disclosed herein may be employed to facilitate the curating of valuable information in a transcript of a chat into a webpage. The webpage may then be published online and indexed in order to drive traffic to one or more websites related to the subject matter of the chat.

In one example embodiment, curating chat transcripts into webpages includes generating a transcript of a chat, selecting the chat transcript for curation, curating the chat transcript by adding preferable information to the chat transcript and/or deleting non-preferable information from the chat transcript, and publishing the curated chat transcript as a webpage.

In another example embodiment, a method of curating chat transcripts into webpages includes generating a transcript of a chat between an expert human agent of an online retailer website and a potential customer of the online retailer website, selecting the chat transcript for curation, curating the chat transcript by adding preferable information to the transcript and/or deleting non-preferable information from the transcript, and publishing the curated chat transcript as a webpage on the online retailer website in order to drive traffic to the online retailer website.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
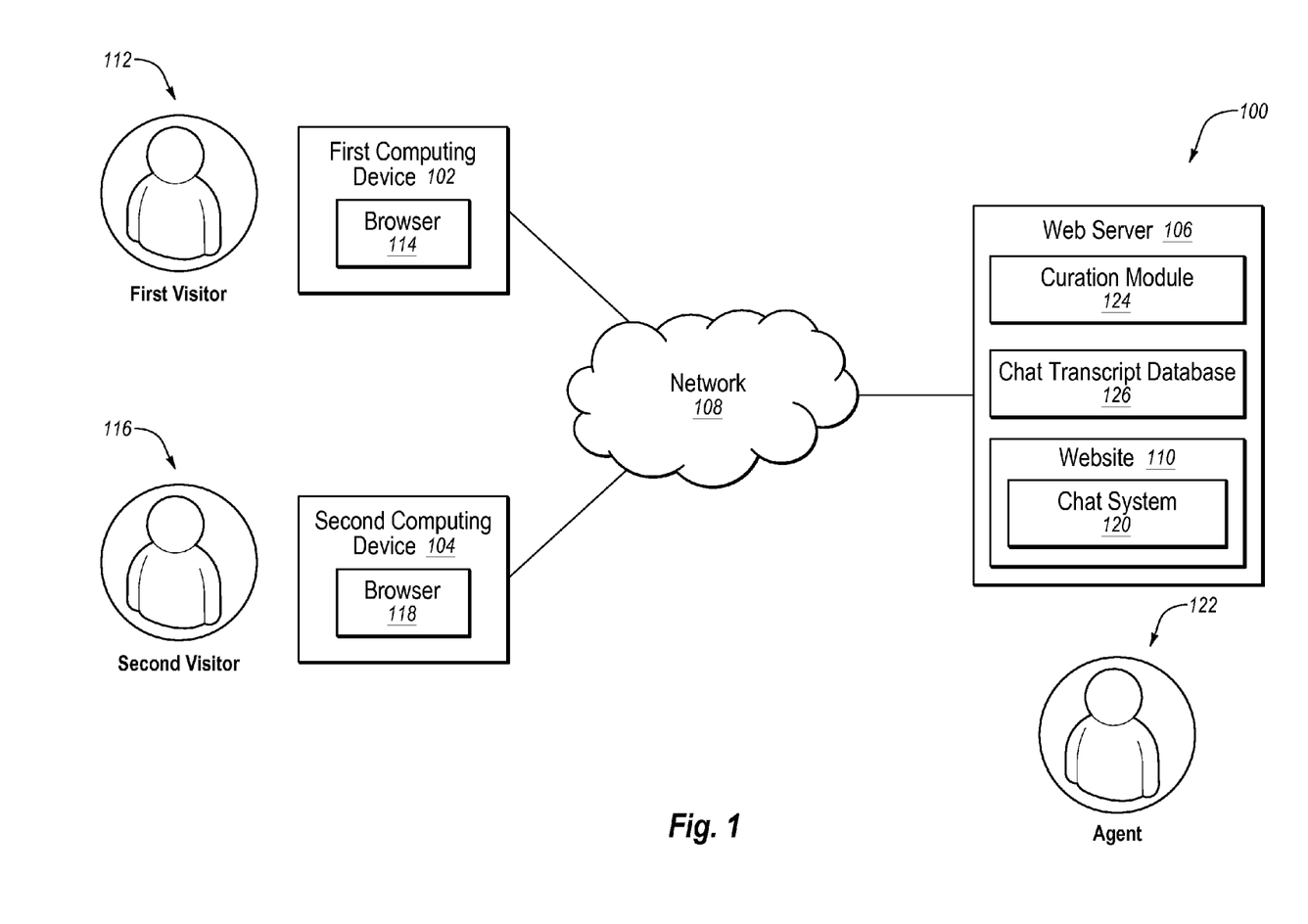
FIG. 1 is a schematic block diagram illustrating an example chat transcript curation system.

FIG. 1 is a schematic block diagram illustrating an example chat transcript curation system 100. As disclosed in FIG. 1, the example system 100 includes a first computing device 102, a second computing device 104, and a web server 106. The first and second computing devices 102 and 104 are able to communicate with the web server 106 over a network 108. The web server 106 hosts a website 110. A first visitor 112 can employ a browser application 114 on the first computing device 102 to visit the website 110. Similarly, a second visitor 116 can employ a browser application 118 on the second computing device 104 to visit the website 110.

The website 110 may be operated, for example, by an online retailer and may include a chat system 120 for use by online retailer sales support agents and customer support agents. For example, upon visiting the website 110, the first visitor 112 and/or the second visitor 116 may be invited to chat, using the chat system 120, with a human agent 122 of the website 110. The term "chat" as used herein refers to a live engagement or dialog between two parties, such as an expert in a good or service and a customer potentially seeking the good or the service. Unlike message boards, forums, postings, or other types of asynchronous offline communication, a chat is a synchronous online dialog that could involve, for example, a text chat, a whiteboard chat, a screen sharing or window sharing chat, a voice chat, a video chat, or any combination thereof. Additional details regarding a chat between a visitor to a website and human agent of the website can be found in U.S. patent application Ser. Nos. 13/462,704 and 13/462,711, both filed on May 2, 2012, which are both incorporated herein by reference in their entireties.

A curation module 124 included on the web server 106 may be employed to curate transcripts of chats, that are stored in a chat transcript database 126, into webpages that can be hosted on the website 110 or hosted on one or more other websites.

These webpages may then be indexed in order to drive traffic to the website(s) on which the webpages are hosted.

The first and second computing devices 102 and 104 may each be any computing device capable of executing a browser application and communicating over the network 108 with the web server 106. For example, the first and second computing devices 102 and 104 may each be a physical computer such as a personal computer, a desktop computer, a laptop computer, a tablet computer, a handheld device, a multiprocessor system, a microprocessor-based or programmable consumer electronic device, a smartphone, or some combination thereof. The first and second computing devices 102 and 104 may each also be a virtual computer such as a virtual machine. The network 108 may be any wired or wireless communication network including, for example, a Local Area Network (LAN), a Metropolitan Area Network (MAN), a Wide Area Network (WAN), a Wireless Application Protocol (WAP) network, a Bluetooth® network, an Internet Protocol (IP) network such as the internet, or some combination thereof.

Although only a single web server 106 is disclosed in FIG. 1, it is understood that the website 110 may actually be hosted across multiple web servers. Also, although only a single chat system 120 and a single agent 122 are disclosed in FIG. 1, it is understood that multiple chat systems 120 and/or multiple agents 122 may be employed in chats with visitors to the website 110. Further, although only two computing devices 102 and 104 are disclosed in FIG. 1, it is understood that the website 110 may actually be visited by any number of visitors using any number of different computing devices. Further, although the curation module 124 is the only module disclosed in the example system 100 of FIG. 1, it is understood that the functionality of the curation module 124 may be replaced or augmented by one or more similar modules residing on the first computing device 102, the second computing device 104, the web server 106, or another machine or system. Also, it is understood that the website 110 may be any type of website including, but not limited to, a product support website, an online learning website, a genealogy website where genealogy is offered as a service, or some combination thereof.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2:
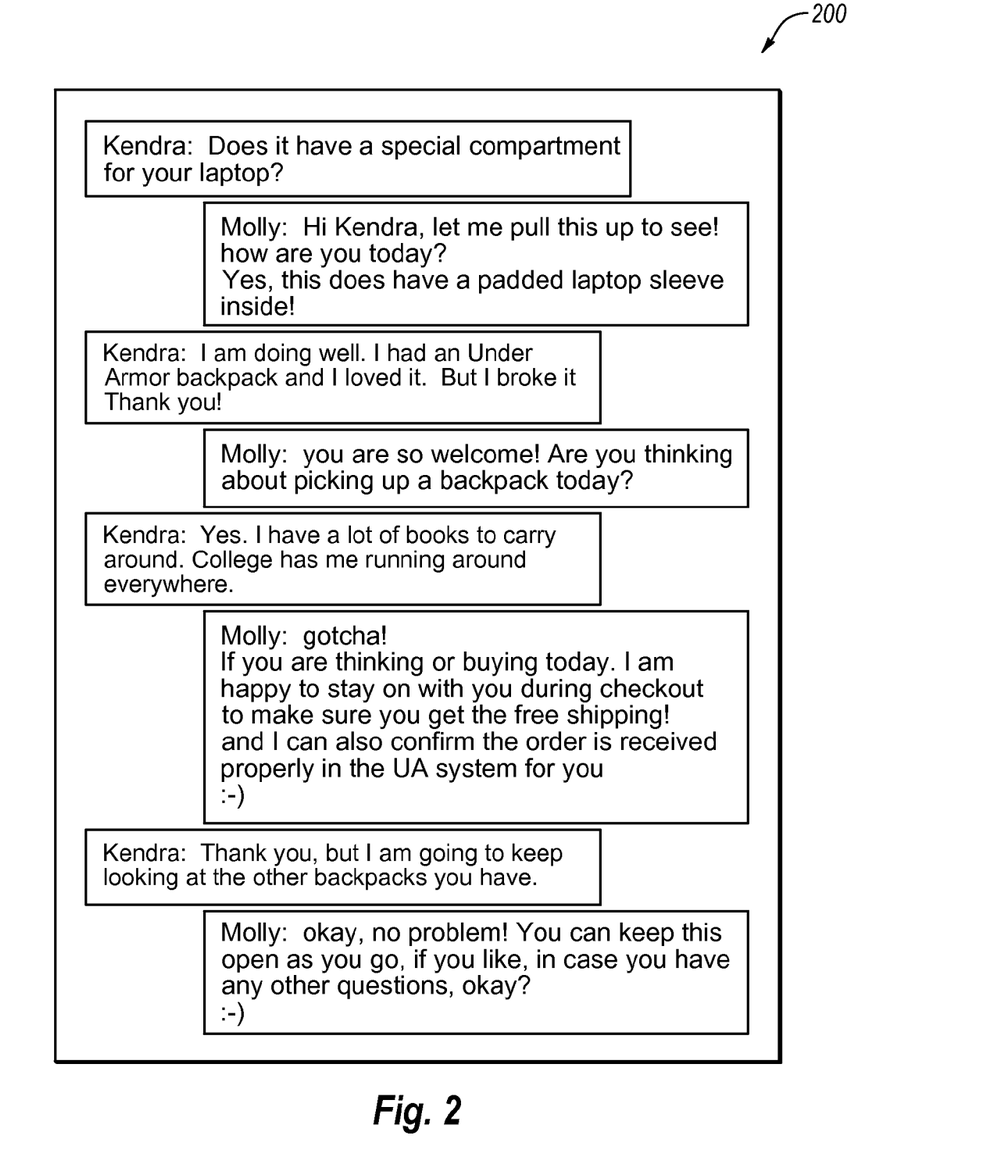
FIG. 2 is an example chat transcript.

FIG. 2 is an example chat transcript 200. The chat transcript 200 may be, for example, a transcript of a chat that occurred between the first visitor 112 and the agent 122 using the chat system 120 of the website 110 of FIG. 1. The chat transcript 200 may be stored in the chat transcript database 126 of FIG. 1. The chat transcript 200 may be automatically or manually generated from any type of chat disclosed herein.

Figure 3:
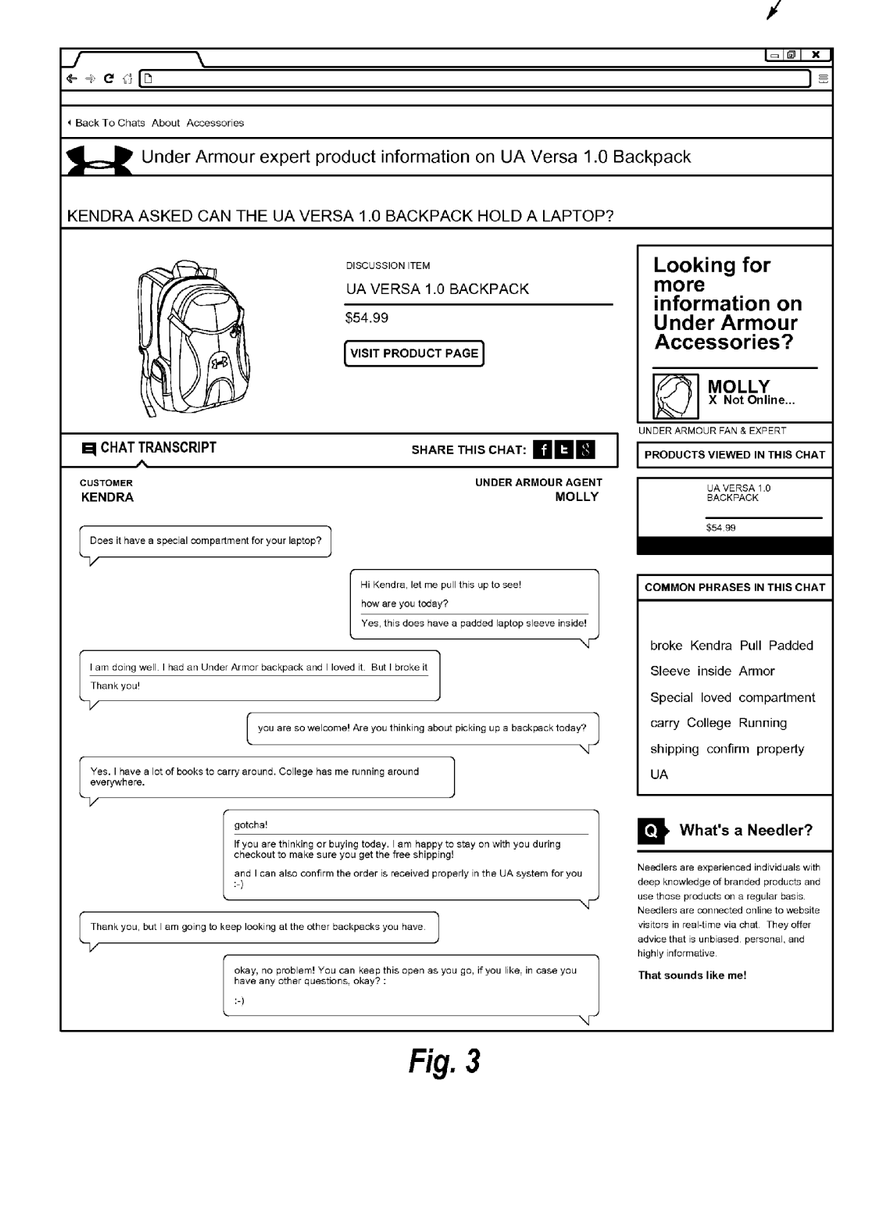
FIG. 3 is an example webpage that resulted from the curation of the chat transcript of FIG. 2.

FIG. 3 is an example webpage 300 that resulted from the curation of the chat transcript 200 of FIG. 2. In general, the curation of a chat transcript into a webpage may involve the adding of preferable information to the chat transcript and the deleting of non-preferable information from the chat transcript.

For example, the adding of preferable information may include the adding of expanded brand acronyms, brand names, product names, links to a related product page of a website of an online retailer, a main question being asked and answered in the chat, a category of the chat, keywords related to the chat, long-tail keywords related to the chat, or some combination thereof. Further, the deleting of non-preferable information may include the deleting of private personal information about participants in the chat, curse words, monosyllabic words, warranty information, retail location information, expired sale information, or some combination thereof.

In addition, the webpage into which the curated chat transcript is integrated may also include structure that provides online visitors with information beyond the information contained in the curated chat transcript alone. For example, the webpage may include one or more headers (such as H1 and H2 html or xml headers) that include a question being asked and answered in the chat, an offer to chat with the original expert human agent involved in the chat or another expert human agent if the original agent is not available, links embedded in text of the chat transcript, a picture of a product being discussed in the chat, links to a product webpage of an online retailer website that corresponds to a product being discussed in the chat, keywords from the curated chat transcript, links related to a subject matter of the chat including links to product webpages of related products, or some combination thereof. The webpage may also be given a name that will appear in the URL of the webpage and that is descriptive of the subject matter of the chat.

Therefore, the webpage 300 of FIG. 3 resulted from the curation of the chat transcript 200 of FIG. 2 and includes valuable information conveyed during the chat. The webpage 300 may be published online and indexed in order to drive traffic to one or more websites related to the subject matter of the chat.

Figure 4:
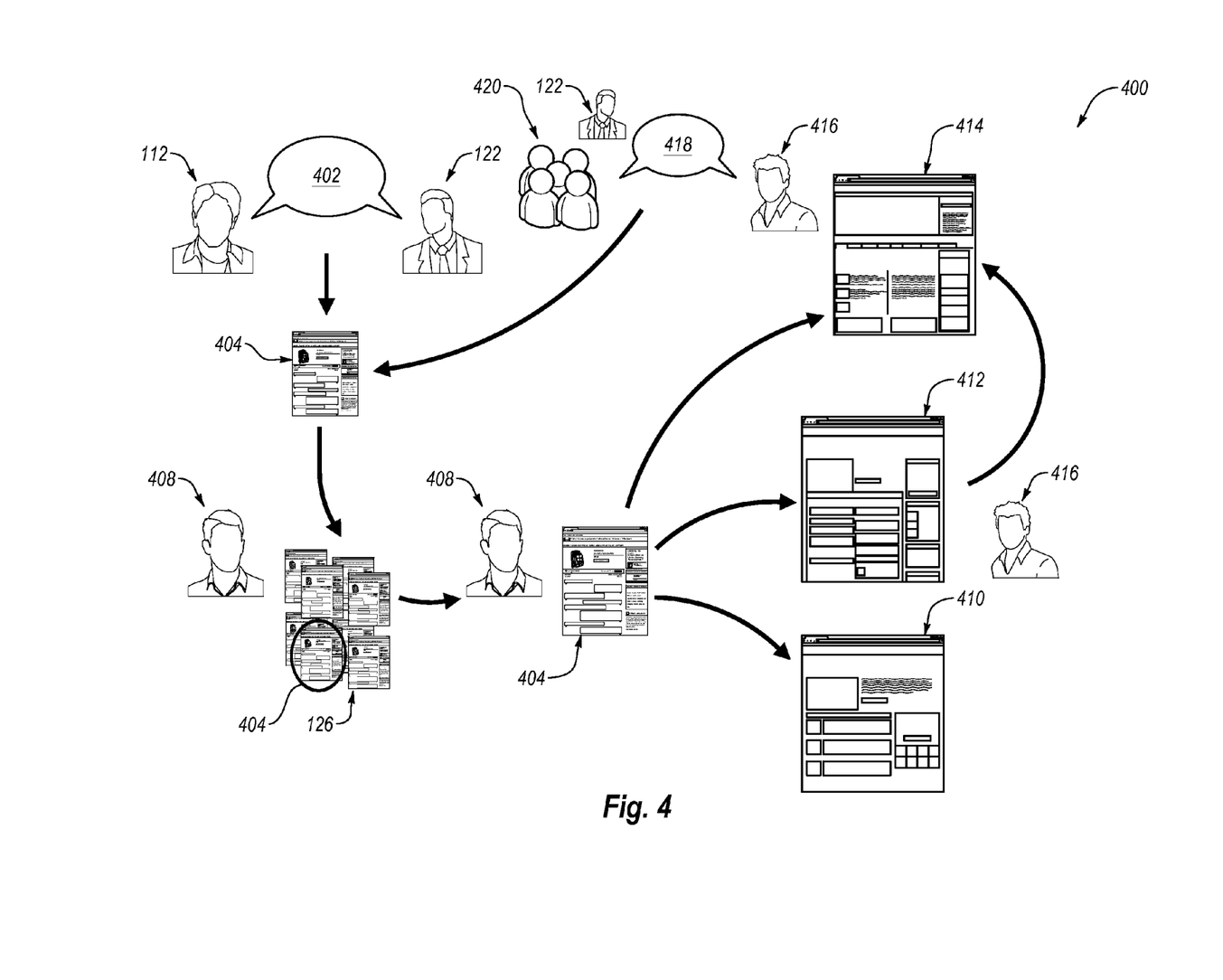
FIG. 4 is a schematic flowchart diagram of an example process for chat transcript curation.

FIG. 4 is a schematic flowchart diagram of an example process 400 for chat transcript curation. As disclosed in FIG. 4, the first visitor 112 and the agent 122 have a chat 402. A chat transcript 404 of the chat 402 is then automatically or manually generated and stored in a database 126 of chat transcripts. A curator 408 then accesses the chat transcript database 126 and selects particular chat transcripts based on their content that are good candidates for curation, such as the chat transcript 404. The curator 408 then curates the chat transcript 404 into one or more webpages 410-414. For example, the webpage 410 may be specifically designed to be an ad landing webpage, the webpage 412 may be specifically designed to be a search engine optimization webpage, and the webpage 414 may be specifically designed to be a syndication webpage for hosting on the website of an online retailer who sells a product mentioned in the chat transcript 404. Once the webpages 410-414 are created and published online, another visitor 416 may find the webpage 410 through a targeted ad of a search engine, or may find the webpage 412 through an organic search on the search engine. Then, a link on the webpage 410 or webpage 412 may take the visitor 416 to the webpage 414 of the online retailer website. This may lead to an additional chat 418 between the visitor 416 and the agent 122, or another agent in a group of agents 420, which will result in an additional chat transcript being added to the chat transcript database 126, and potentially one or more webpages created as a result of the curation of the additional chat transcript.

Chats between website agents and website visitors may be product and sales centric and may cover questions of both broad and specific subject matter. These chats may also include native dialect and be keyword dense. As a result, the subject matter in these chats may be valuable to other potential purchasers of the product(s) discussed in the chats. Therefore, curating a chat transcript into a webpage may result in a webpage that will naturally appear very high in the organic search results of online search engines. These curated webpages may provide broad long tail keyword reach, may target competitive keywords/phrases/questions, may contain sales questions likely to be the subject of searches by other potential customers, may provide a convenient means by which a potential customer may chat with the same agent involved in the original chat, may drive traffic back to the online retailer website which will hopefully result in increased sales on the online retailer website, and may provide back links to the online retailer website that will tend to push the online retailer website higher in search results of online search engines. In this manner, valuable information conveyed during the chats 402 and 418 can be curated in the form of the webpages 410-414 that may be published online and indexed in order to drive traffic to one or more websites related to the subject matter of the chats 402 and 418.

Figure 5:
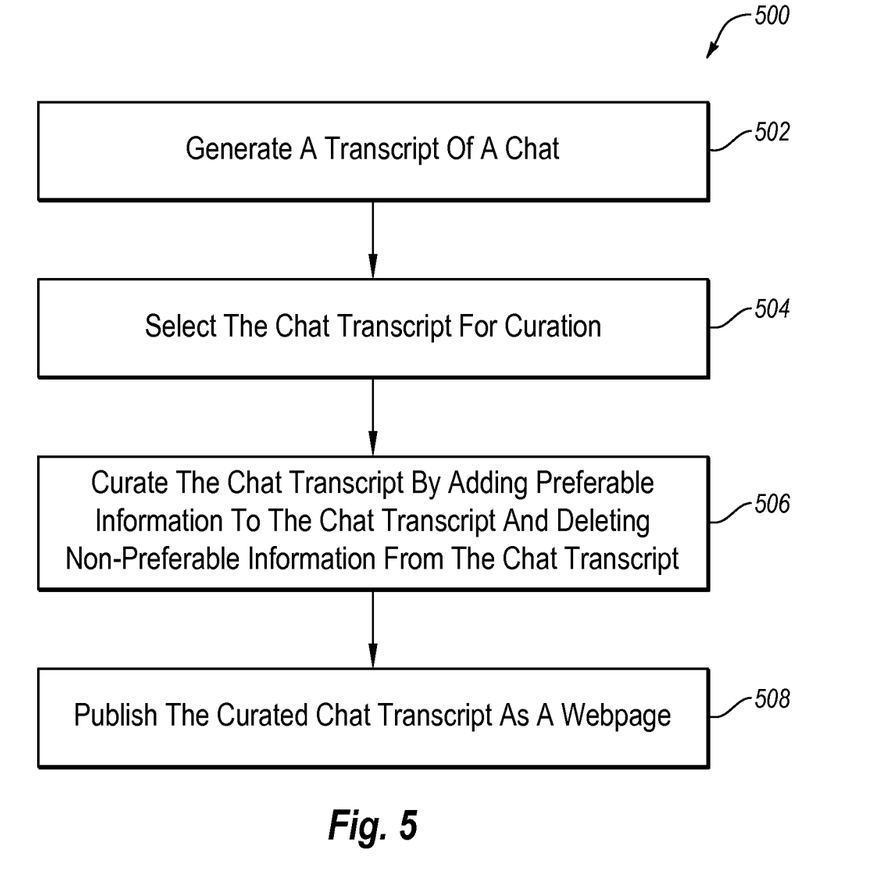
FIG. 5 is a schematic flowchart diagram of an example method of curating chat transcripts into webpages.

FIG. 5 is a schematic flowchart diagram of an example method 500 of curating chat transcripts into webpages. The method 500 may be implemented, in at least some embodiments, by the curation module 124 of the example system 100 of FIG. 1. For example, the curation module 124 may be configured to execute computer instructions to perform operations of chat transcript curation for chats that take place using the chat system 120 on the website 110, as represented by one or more of the steps of the method 500. Although illustrated as discrete steps, various steps may be divided into additional steps, combined into fewer steps, or eliminated, depending on the desired implementation. The method 500 will now be discussed with reference to FIGS. 1-5.

The method 500 may include step 502 in which a transcript of a chat is generated. For example, the first visitor 112 may employ the browser application 114 on the first computing device 102 to visit the website 110 of FIG. 1. As disclosed in FIG. 4, during the visit to the website 110, the first visitor 112 may be invited to the chat 402 with the agent 122. As disclosed in FIG. 4, this chat 402 may be recorded, and the chat transcript 404 of the chat 402 may be automatically or manually generated and then stored in the chat transcript database 126.

The method 500 may include a step 504 in which the chat transcript is selected for curation. For example, as disclosed in FIG. 4, the curator 408 may select the chat transcript 404 for curation from among the other chat transcripts stored in the chat transcript database 126. The chat transcripts in the database 126 may be indexed and searchable based on words in the chat transcripts and/or based on a variety of metadata stored with each chat transcript including, but not limited to, the name of the agent involved in the chat, the name of the visitor involved in the chat, the email of the customer involved in the chat, the duration of the chat, whether the chat was peer reviewed, whether the visitor has been banned, whether the product is existing, or some combination thereof. It is noted that the chat transcript 404 may alternatively be selected automatically based on similar criteria without the action of the curator 408.

The method 500 may include a step 506 in which the chat transcript is curated by adding preferable information to the chat transcript and deleting non-preferable information from the chat transcript. For example, the curator 408 may employ one or more software tools to manually or automatically curate the chat transcript 200 of FIG. 2 by adding preferable information to the chat transcript 200 and deleting non-preferable information from the chat transcript 200. It is noted that the chat transcript 404 may alternatively be automatically curated without the action of the curator 408.

The method 500 may include a step 508 in which the curated chat transcript is published as a webpage. For example, once curated, the chat transcript 200 of FIG. 2 may be automatically or manually published as the webpage 300 of FIG. 3. The webpage 300 may include any of the additions and/or deletions disclosed herein in connection with curated chat transcripts. The webpage 300 may be published on various websites including, but not limited to, a website of a provider of a chat service associated with the chat, a website of an online retailer associated with a product discussed in the chat, a social media website, or some combination thereof. Further, the webpage 300 may be added to the sitemap of the website where the webpage 300 is published and indexed by online search engines. The curated webpage may then appear in organic search results where search terms in a search relate to the subject matter of the curated webpage. Then, when a visitor visits the webpage 300, the interaction of the visitor may be tracked, and revenue-generating behaviors of the visitor (such as a click-through to a related online retailer website that results in a purchase) may be encouraged and billed to the online retailer, thus providing a revenue stream for the provider of the curation system. The data that may be tracked as visitors interact with the webpage 300 and other similar webpages may include, but is not limited to, the current return on investment (ROI), the number of visits to the online retailer website, the number of new customers, the number of purchases, the revenue data and site lift, the total number of curated webpages (both created and published), any keyword(s) purchased and the bid amounts for pay-per-click ads, the on-page click-through rate (CTR) to the partner online retailer website, the conversion rates of visitors who clicked through the webpages, the chat take rated on the webpages, the chat take rate on the online retailer website, or some combination thereof.

In addition, webpages that include curated chat transcripts may need ongoing maintenance to ensure that the webpages are not dropped from the indexes of search engines, such as Google and Bing. For example, crawling errors, indexing issues, and dead links may need to be tracked and resolved on an ongoing basis due to the rapidly evolving nature of associated online retailer websites. By resolving these and other search engine issues on these webpages, the dropping of these webpages from the indexes of search engines may be avoided.

The method 500 may therefore be employed to store and later curate valuable information conveyed during a chat in the form of webpages. These webpages may then be published online and indexed in order to drive traffic to one or more websites related to the subject matter of the chat.

The embodiments described herein may include the use of a special-purpose or general-purpose computer including various computer hardware or software modules or filters, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general-purpose computer, special-purpose computer, or virtual computer such as a virtual machine. Combinations of the above may also be included within the scope of computer-readable media.

Computer-executable instructions comprise, for example, instructions and data which cause a general-purpose computer, special-purpose computer, or virtual computer such as a virtual machine to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method of curating chat transcripts into webpages, the method comprising:
   automatically generating a transcript of a chat, the chat being a synchronous online dialog between two or more humans, the chat transcript being separate from the chat itself;
   selecting the chat transcript for curation;
   curating the chat transcript by adding inline preferable information to the chat transcript and/or deleting non-preferable information from the chat transcript;
   automatically generating a static new webpage separate from the chat itself that includes:
      a transcript portion which includes the curated chat transcript; and
      a value-added portion which includes value-added information beyond inline information contained in the curated chat transcript; and
   automatically publishing the static new webpage separately from the chat itself and in a location to be indexed by an indexing service.

2. The method as recited in claim 1, wherein the preferable information includes an expanded brand acronym of an acronym mentioned in the chat.

3. The method as recited in claim 1, wherein the value-added information includes long-tail keywords related to the chat.

4. The method as recited in claim 1, wherein the non-preferable information includes private personal information about a participant in the chat.

5. The method as recited in claim 1, wherein the non-preferable information includes warranty information.

6. The method as recited in claim 1, wherein the publishing of the static new webpage includes publishing the static new webpage on a website of a provider of a chat service associated with the chat.

7. The method as recited in claim 1, wherein the automatic publishing of the static new webpage includes automatically publishing the static new webpage on a website of an online retailer associated with a product discussed in the chat.

8. The method as recited in claim 1, wherein the automatic publishing of the static new webpage includes automatically publishing the static new webpage on a social media website.

9. The method as recited in claim 1, wherein the chat is between an expert human agent of an online retailer website and a potential customer of the online retailer website.

10. The method as recited in claim 9, wherein the value-added portion of the static new webpage includes one or more headers that include a question being asked and answered in the chat.

11. The method as recited in claim 9, wherein the value-added portion of the static new webpage includes a picture of a product being discussed in the chat.

12. The method as recited in claim 9, wherein the static new webpage is automatically published with a static human-readable URL that matches a name of the static new webpage and that is descriptive of a subject matter of the chat.

13. One or more non-transitory computer-readable media storing one or more programs that cause one or more processors to execute the method as recited in claim 1.

14. The method as recited in claim 1, wherein the chat takes place on a transitory webpage while the static new webpage is not transitory.

15. The method as recited in claim 1, wherein the chat is a voice chat and the transcript is an automatically generated text transcript of the voice chat.

16. The method as recited in claim 1, wherein the chat is a video chat and the transcript is an automatically generated text transcript of the video chat.

17. The method of claim 1, further comprising tracking interactions of visitors with the static new webpage in order to generate a current return on investment for the static new webpage.

18. The method of claim 1, further comprising maintaining the static new webpage, by tracking and resolving dead links on an ongoing basis, to prevent the static new website from being dropped by the indexing service.

19. A method of curating chat transcripts into webpages, the method comprising:
   automatically generating a transcript of a chat between an expert human agent of an online retailer website and a potential customer of the online retailer website, the chat being a synchronous online dialog, the chat transcript being separate from the chat itself;
   selecting the chat transcript for curation;
   curating the chat transcript by adding inline preferable information to the transcript and/or deleting non-preferable information from the transcript;
   automatically generating a static new webpage separate from the chat itself that includes:
      a transcript portion which includes the curated chat transcript; and
      a value-added portion which includes value-added information beyond inline information contained in the curated chat transcript; and
   automatically publishing the static new webpage separately from the chat itself and on the online retailer web site in order to drive traffic to the online retailer web site and in a location to be indexed by an indexing service.

20. The method as recited in claim 19, wherein the preferable information includes a product name and model number of a product mentioned in the chat.

21. The method as recited in claim 19, wherein the non-preferable information includes monosyllabic words.

22. The method as recited in claim 19, wherein the static new webpage is further automatically published on a website of a provider of a chat service associated with the chat, on a social media website, or on some combination thereof.

23. The method as recited in claim 19, wherein the value-added portion of the static new webpage includes one or more headers that include an offer to chat with the expert human agent involved in the chat.

24. The method as recited in claim 19, wherein the static new webpage is published with a static human-readable URL that matches a name of the static new webpage and that is descriptive of a subject matter of the chat.

25. One or more non-transitory computer-readable media storing one or more programs that cause one or more processors to execute the method as recited in claim 19.

26. The method as recited in claim 19, wherein the chat takes place on a transitory webpage while the static new webpage is not transitory.

27. The method as recited in claim 19, wherein the chat is a voice chat and the transcript is an automatically generated text transcript of the voice chat.

28. The method as recited in claim 19, wherein the chat is a video chat and the transcript is an automatically generated text transcript of the video chat.

29. The method of claim 19, further comprising tracking interactions of visitors with the static new webpage in order to generate a click-through rate from the static new webpage to the online retailer website.

30. The method of claim 19, further comprising maintaining the static new webpage, by tracking and resolving indexing issues on an ongoing basis, to prevent the new website from being dropped by the indexing service.

31. A method of curating chat transcripts into webpages, the method comprising:
    automatically generating a transcript of a synchronous online dialog chat between an expert human agent of an online retailer website and a potential human customer of the online retailer website, the chat transcript being separate from the chat itself;
    selecting the chat transcript for curation;
    curating the chat transcript by adding inline preferable information to the transcript and/or deleting non-preferable information from the transcript;
    automatically generating a static new webpage separate from the chat itself that includes:
        a transcript portion which includes the curated chat transcript; and
        a value-added portion which includes value-added information beyond inline information contained in the curated chat transcript; and
    automatically publishing the static new webpage separately from the chat itself and on the online retailer web site and in a location to be indexed by an indexing service, the static new webpage being published with a static human-readable uniform resource locator (URL) that matches a name of the static new webpage and that is descriptive of a subject matter of the chat.

* * * * *